United States Patent Office 3,341,605
Patented Sept. 12, 1967

3,341,605
PREPARATION OF METHYLENE BIS(TRIHYDROCARBYLPHOSPHONIUM) TETRAHALIDES
Daniel W. Grisley, Jr., Kirkwood, Mo., assignor to Monsanto Research Corporation, St. Louis, Mo., a corporation of Delaware
No Drawing. Filed Nov. 13, 1964, Ser. No. 411,139
4 Claims. (Cl. 260—606.5)

This invention relates to phosphorus compounds, and more particularly, provides a novel method of making certain phosphorus compounds.

As set forth in the application of Clifford N. Matthews and John S. Driscoll, Ser. No. 302,697, filed Aug. 16, 1963, assigned to the same assignee as the present invention, addition of a halogen molecule to a methylene-bis-(tri-substituted-phosphonium halide) produces an addition compound, a methylenebis(tri-substituted phosphonium) tetrahalide. This may be illustrated, for example, by the reaction

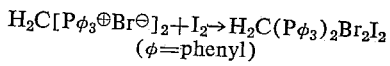
($\phi$=phenyl)

In accordance with the present invention, it has now been found that the reaction of a trihydrocarbylphosphine with a (halomethyl)trihydrocarbylphosphonium halide at elevated temperatures produces a methylenebis(trihydrocarbylphosphonium)tetrahalide.

The reaction may be illustrated by the equation

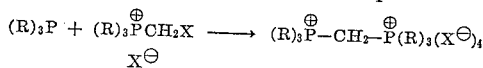

where each R is a hydrocarbon radical free of aliphatic unsaturation and containing up to 18 C atoms and each X is a halogen atom (F, Cl, Br or I). It is to be understood that in the above formulas, each X and each R may be the same or different; thus

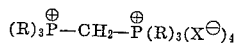

is the equivalent of the formula

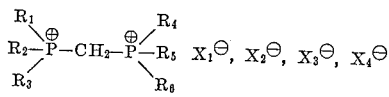

where each R (each of $R_1$, $R_2$, $R_3$, $R_4$, $R_5$ and $R_6$) is a hydrocarbon radical free of aliphatic unsaturation and containing up to 18 carbon atoms, and each X (each of $X_1$, $X_2$, $X_3$ and $X_4$) is a halogen atom with an atomic weight below 130.

As will be seen from this equation, the halomethyl phosphonium halide reactant supplies only two halogen atoms, whereas the product contains four. A second product is a trihydrocarbyl[(trihydrocarbyl-phosphoranylidene)methyl]phosphonium halide, of the formula

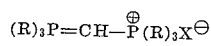

(which is a mesomeric compound, in which the charge resonates between the two phosphorus atoms, and is thus better represented by the formula

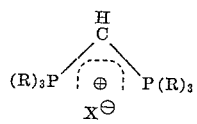

showing the charge as distributed (see J. S. Driscoll et al., J. Org. Chem. 29 (1964), 2427). Formation of this monohalide may be the source of the additional halogen atoms in the tetrahalide product. The mechanism of the reaction is not at present clearly understood; however, in any case, the reaction produces the stated tetrahalide product.

Illustrative of the tetrahalide products which may be obtained in accordance with this invention are, for example, methylene bis(triphenylphosphonium) tetrachloride, methylene bis(triphenylphosphonium) tetrabromide, methylene bis(triphenylphosphonium) tetraiodide, methylene bis(tri - p - tolylphosphonium) tetrachloride, methylene bis(tributylphosphonium) bromide trichloride, methylene bis(tricyclohexylphosphonium) tetrabromide, methylene bis(triphenylphosphonium) fluoride triiodide, methylene bis(trinaphthylphosphonium) tetrachloride, methylene bis(tripentylphosphonium) tetrabromide, methylene bis(triphenylphosphonium) diiodide dibromide, methylene bis(tridecylphosphonium) tetrabromide, methylene bis(tribenzylphosphonium) tetrabromide, methylene bis(butyldiphenylphosphonium) tetraiodide, methylene triphenylphosphonium tributylphosphonium tetrabromide, methylene bis(triethylphosphonium) trichloride fluoride, methylene bis(triphenylphosphonium) dibromide dichloride, methylene bis(tributylphosphonium) dibromide dichloride, methylene bis(tri-o-tolylphosphonium) tetraiodide, and so forth.

The reactants employed in conducting the method of this invention for producing the stated tetrahalides include a trihydrocarbyl phosphine and a halomethyl trihydrocarbyl phosphonium halide. Triarylphosphines and triarylphosphonium halides are preferred, and bromine is the preferred halogen.

Useful phosphine starting materials are trihydrocarbyl phosphines where each hydrocarbyl radical is a hydrocarbon radical containing up to 18 carbon atoms and free of aliphatic unsaturation, such as triphenylphosphine, tri-p-tolylphosphine, trixlylphosphine, tris(p-butylphenyl) phosphine, trinaphthylphosphine, tribiphenylylphosphine, triphenethylphosphine, tributylphosphine, triethylphosphine, ethyldiphenylphosphine, and so forth.

Useful phosphonium starting materials are halomethyl trihydrocarbyl phosphonium halides such as (bromomethyl) triphenyl phosphonium bromide, (bromomethyl) tri-p-tolyl phosphonium chloride, (iodomethyl) triphenyl phosphonium iodide, (bromomethyl) tris (p-butylphenyl) phosphonium fluoride, (bromomethyl) trinaphthyl phosphonium bromide, (chloromethyl) triphenethyl phosphonium bromide, (bromomethyl) trioctyl phosphonium bromide, (bromomethyl) tributyl phosphonium fluoride, (bromomethyl) triethyl phosphonium bromide, (bromomethyl) methyldiphenyl phosphonium chloride, (chloromethyl) tribiphenylyl phosphonium bromide, and so forth.

The presently provided procedure for reacting the phosphine and phosphonium compound to produce a methylene diphosphonium tetrahalide consists in heating a mixture of the stated reactants at an elevated temperature, above about 100° C.

The ratio of the stated reactants may be about a 1:1 molar ratio, or may vary from this, either being in excess, within a range up to 5 moles of the one to 1 mole of the other, for example. Preferably the reactants are contacted and heated in solution. Useful solvents are high-boiling (above 100° C.) inert organic liquids having a relatively high dielectric constant (above 10), such as benzonitrile, nitrobenzene or the like. The temperature of the reaction mixture may range from above about 100° C. up to the decomposition temperatures of the reaction components. In general, temperatures in the 100–200° C. range are preferred, and 125–175° C. is the most preferred range. Atmospheric or autogenous pressures, in a closed pressure vessel, are usually suitable.

On completion of the reaction, usual procedures such as extraction, filtration and the like are employed to isolate the desired tetrahalide product.

The invention is illustrated but not limited by the following example.

A mixture of 5.42 grams (g.) of triphenylphosphine (0.02 moles) and 8.72 g. (0.02 moles) of (bromomethyl)triphenylphosphonium bromide in 50 milliliters (ml.) of benzonitrile is refluxed (about 150° C.) for 23 hours. The resulting reaction mixture is cooled under nitrogen, and the benzonitrile is evaporated off at 50° C./1 mm. Hg vacuum. The residual mass is triturated with 400 ml. of hot benzene, producing a dark powder. The powder is mixed with 80 ml. of methanol (partial solubility), and the mixture is heated to the boiling point. When this is cooled, a bright yellow solid separates, which is filtered off and dried. This is methylenebis(triphenylphosphonium) tetrabromide, $H_2C[P(C_6H_5)_3]_2Br_4$, M.P. 256–259° C. (corr.) (dark red melt).

Calcd. for $C_{37}H_{32}Br_4P_2$: C, 51.8; H, 3.76; Br, 37.2; P, 7.22. Found: C, 51.4; H, 4.03; Br, 36.0; P, 7.16.

Heating this product with phenol produces bromination of the phenol, with formation of methylenebis(triphenylphosphonium bromide), a white solid, melting at about 300° C., soluble in methanol.

The infrared spectrum and melting point of the stated tetrahalide are identical with those of a sample of methylene bis(triphenylphosphonium) tetrabromide produced by a different method.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A method of making a methylenebis(trihydrocarbylphosphonium) tetrahalide comprising heating a trihydrocarbylphosphine with a (halomethyl)trihydrocarbylphosphonium halide, wherein each said hydrocarbyl is free of aliphatic unsaturation and contains up to 18 carbon atoms, and each halogen is halogen of atomic weight below 130.

2. The method of claim 1 in which said hydrocarbyl radicals are aryl radicals.

3. The method of claim 1 in which said halogen are bromine.

4. The method of making methylenebis(triphenylphosphonium) tetrabromide which comprises heating triphenylphosphine with (bromomethyl)triphenylphosphonium bromide.

References Cited

UNITED STATES PATENTS 3,262,971  7/1966  Matthews ---------- 260—606.5

TOBIAS E. LEVOW, *Primary Examiner.*

W. F. W. BELLAMY, *Assistant Examiner.*